(12) United States Patent
Chan et al.

(10) Patent No.: US 11,868,979 B2
(45) Date of Patent: Jan. 9, 2024

(54) SYSTEM AND PROCESS FOR ELECTRONIC PAYMENTS

(71) Applicant: BANK OF MONTREAL, Toronto (CA)

(72) Inventors: Brian Chan, Toronto (CA); Kashif Arshad, Toronto (CA); Peter Hing-Cheong Poon, Toronto (CA); Vikram Pal, Toronto (CA)

(73) Assignee: BANK OF MONTREAL, Toronto (CA)

( * ) Notice: Subject to any disclaimer, the term of this patent is extended or adjusted under 35 U.S.C. 154(b) by 74 days.

(21) Appl. No.: 17/252,488

(22) PCT Filed: Jun. 14, 2019

(86) PCT No.: PCT/CA2019/050845
§ 371 (c)(1),
(2) Date: Dec. 15, 2020

(87) PCT Pub. No.: WO2019/237208
PCT Pub. Date: Dec. 19, 2019

(65) Prior Publication Data
US 2021/0272084 A1   Sep. 2, 2021

Related U.S. Application Data

(60) Provisional application No. 62/685,534, filed on Jun. 15, 2018.

(51) Int. Cl.
*G06Q 20/10* (2012.01)
*G06Q 20/14* (2012.01)
*G06Q 20/38* (2012.01)
*G06Q 20/40* (2012.01)
*G06Q 20/42* (2012.01)

(52) U.S. Cl.
CPC .......... *G06Q 20/14* (2013.01); *G06Q 20/389* (2013.01); *G06Q 20/3821* (2013.01); *G06Q 20/4016* (2013.01); *G06Q 20/42* (2013.01)

(58) Field of Classification Search
CPC ....... G06Q 20/14; G06Q 20/389; G06Q 20/42
See application file for complete search history.

(56) References Cited

U.S. PATENT DOCUMENTS

| 9,619,842 | B2 | 4/2017 | Johansen et al. | |
| 10,373,140 | B1* | 8/2019 | Chang | G06F 16/24575 |
| 2002/0052841 | A1* | 5/2002 | Guthrie | G06Q 20/4014 |
| | | | | 705/40 |

(Continued)

OTHER PUBLICATIONS

WIPO, International Search Report and Written Opinion of International Application No. PCT/CA2019/050845, dated Sep. 5, 2019.

*Primary Examiner* — Bennett M Sigmond
*Assistant Examiner* — Marla Hudson
(74) *Attorney, Agent, or Firm* — FOLEY & LARDNER LLP

(57) ABSTRACT

A platform and process for electronic payment processing using electronic communications from different communication channels or bands. The system and process can generate alerts using fraud detection and verify payment requests using historical data and pattern recognition. The system and process can categorize images and extract payment data.

14 Claims, 9 Drawing Sheets

(56) References Cited

U.S. PATENT DOCUMENTS

2011/0004336 A1   1/2011  Numata et al.
2012/0095856 A1   4/2012  Sanjeev
2013/0085935 A1   4/2013  Nepomniachtchi et al.

* cited by examiner

SYSTEM AND PROCESS FOR ELECTRONIC PAYMENTS

FIELD

The present disclosure generally relates to the field of electronic payment processing.

INTRODUCTION

Embodiments described herein relate to payment processing using electronic messages. Customers receive bill or invoice statements from different vendors for payment. The bill or invoice statements can indicate a customer or vendor account, a total payment amount, payment due date, and other data. Embodiments described herein relate to building a predictive model to categorize documents efficiently using limited computing resources.

SUMMARY

In accordance with an aspect, there is provided a payment platform for automatic payment processing of bill or invoice statements using electronic messages, such as e-mail and SMS messages, for example. In various further aspects, the disclosure provides corresponding devices and logic structures such as machine-executable coded instruction sets for implementing such payment systems and processes. In accordance with an aspect, there is provided a payment platform with a predictive model for categorizing bill or invoice statements received as electronic messages.

In accordance with an aspect, there is provided a system for payment processing. The system has a payment server having non-transitory computer-readable storage medium with computer-executable instructions for causing a processor of the payment server to: receive an initial payment request from a first electronic address; verify the first electronic address to retrieve a customer record; categorize and extract payment data from the payment request using the predictive model; generate a vendor payment request using the extracted payment data based on a vendor format, the extracted payment data indicating a vendor identifier linked to the vendor format; transmit a payment confirmation request to a second electronic address, the second electronic address stored in the customer record; receive an approval notification in response to the payment confirmation request from the second electronic address; transmit the vendor payment request; receive a payment confirmation indicating successful processing of the vendor payment request; and update a payment record with the payment confirmation and the extracted payment data, the payment record indicating a customer identifier linked to the customer account. In some embodiments, the processor categorizes, at a bill classification processor, data of the payment request as a bill or not a bill using a predictive model, upon categorization of the bill, extracts payment data values from the data of the payment request, and trains the predictive model using the data of the payment request based on a confidence threshold for the categorization of the bill.

In some embodiments, the payment request comprises a first image and wherein extracting payment data values from the payment request comprises: cleaning the image and categorizing the image as a bill using the predictive model, reading content of the image identified as a bill to extract key values, and self-training the predictive model using the processed image based on a level of confidence of categorizing the image as a bill.

In some embodiments, the system further comprises training the predictive model to categorize a first image received as part of the payment request, wherein the training involves creating image variations of a first image by electronically modifying the first image using different image adjustments, discarding empty space in the first image and the image variations by cropping the first image, segregating the first image and the image variations into different sections based on content and format, and store the processed first image and the image variations into a repository of images.

In some embodiments, the image adjustments are selected from the group of contrast, brightness, and pixels.

In some embodiments, training the predictive model uses images that are bills and images that are not bills, wherein the predictive model can categorize the first image as being a bill or a not bill by cleaning the first image and processing the cleaned first image using a neural network to identify format attributes.

In some embodiments, the format attributes are selected from the group of company logo, header, boxes, sections, alignment of text fields.

In some embodiments, training the predictive model uses a reverse training process with a greater number of images that are not bills than of images that are bills.

In some embodiments, the system has an electronic wallet application having non-transitory computer-readable storage medium with computer-executable instructions for causing a processor of a mobile device to: trigger the display of the payment confirmation request on a display of the mobile device; receive the approval notification in response to the display of the payment confirmation request at the mobile device; transmit the approval notification to the payment server.

In some embodiments, the electronic wallet application is further configured to authorize a customer account prior to receiving the approval notification.

In some embodiments, the payment server is configured to process a registration request to store the first electronic address in the customer record to permit processing of the initial payment request.

In some embodiments, the payment server is configured to determine that the customer record does not indicate bill payment registration and transmit a registration request to the second electronic address stored in the customer record, the registration request indicating that the initial payment request was received from the first electronic address.

In some embodiments, the first electronic address is for a different communication channel or band than the second electronic address.

In some embodiments, the customer record indicates a payment account, wherein the vendor payment request indicates the payment account.

In some embodiments, the approval notification indicates a payment account identifier linked to the payment account.

In some embodiments, the approval notification indicates a code that is linked to a code in the customer record.

In some embodiments, the initial payment request indicates a payment amount, a payment due date, vendor identifier, and vendor account identifier.

In some embodiments, the vendor payment request indicates a payment amount, a payment due date, vendor identifier, a vendor account identifier, and a payment account.

In some embodiments, the first electronic address is an email address and the second electronic address is an SMS address.

In some embodiments, payment server determines if the initial payment request is a duplicate request using historical payment records and upon determining that the initial payment request is a duplicate indicating the detected duplicate in the payment confirmation request.

In some embodiments, the initial payment request indicates a payment amount and a payment due date, the payment due date being a future date, wherein the payment server is configured to hold the vendor payment request until the future date.

In some embodiments, the payment server is configured to: determine that the an initial payment request is a recurring request using historical payment records linked to a customer identifier indicated in the customer record, the recurring request indicating a recurring time period; transmit another payment confirmation request to the second electronic address for the recurring time period; receive another approval notification in response to the payment confirmation request from the second electronic address; transmit another vendor payment request for the recurring time period; receive another payment confirmation indicating successful processing of the other vendor payment request; and update the payment record with the other payment confirmation.

In another aspect, there is provided a non-transitory computer-readable storage medium with computer-executable instructions for causing a processor to: receive an initial payment request from a first electronic address; verify the first electronic address to retrieve a customer record; transmit the initial payment request to a data extraction process; receive extracted payment data; generate a vendor payment request using the extracted payment data based on a vendor format, the extracted payment data indicating a vendor identifier linked to the vendor format; transmit a payment confirmation request to a second electronic address, the second electronic address stored in the customer record; receive an approval notification in response to the payment confirmation request from the second electronic address; transmit the vendor payment request; receive a payment confirmation indicating successful processing of the vendor payment request; and update a payment record with the payment confirmation and the extracted payment data, the payment record indicating a customer identifier linked to the customer account.

In this respect, before explaining at least one embodiment in detail, it is to be understood that the embodiments are not limited in application to the details of construction and to the arrangements of the components set forth in the following description or illustrated in the drawings. Also, it is to be understood that the phraseology and terminology employed herein are for the purpose of description and should not be regarded as limiting.

Many further features and combinations thereof concerning embodiments described herein will appear to those skilled in the art following a reading of the instant disclosure.

DETAILED DESCRIPTION

Embodiments of methods, systems, and apparatus are described through reference to the drawings.

Figure 1:
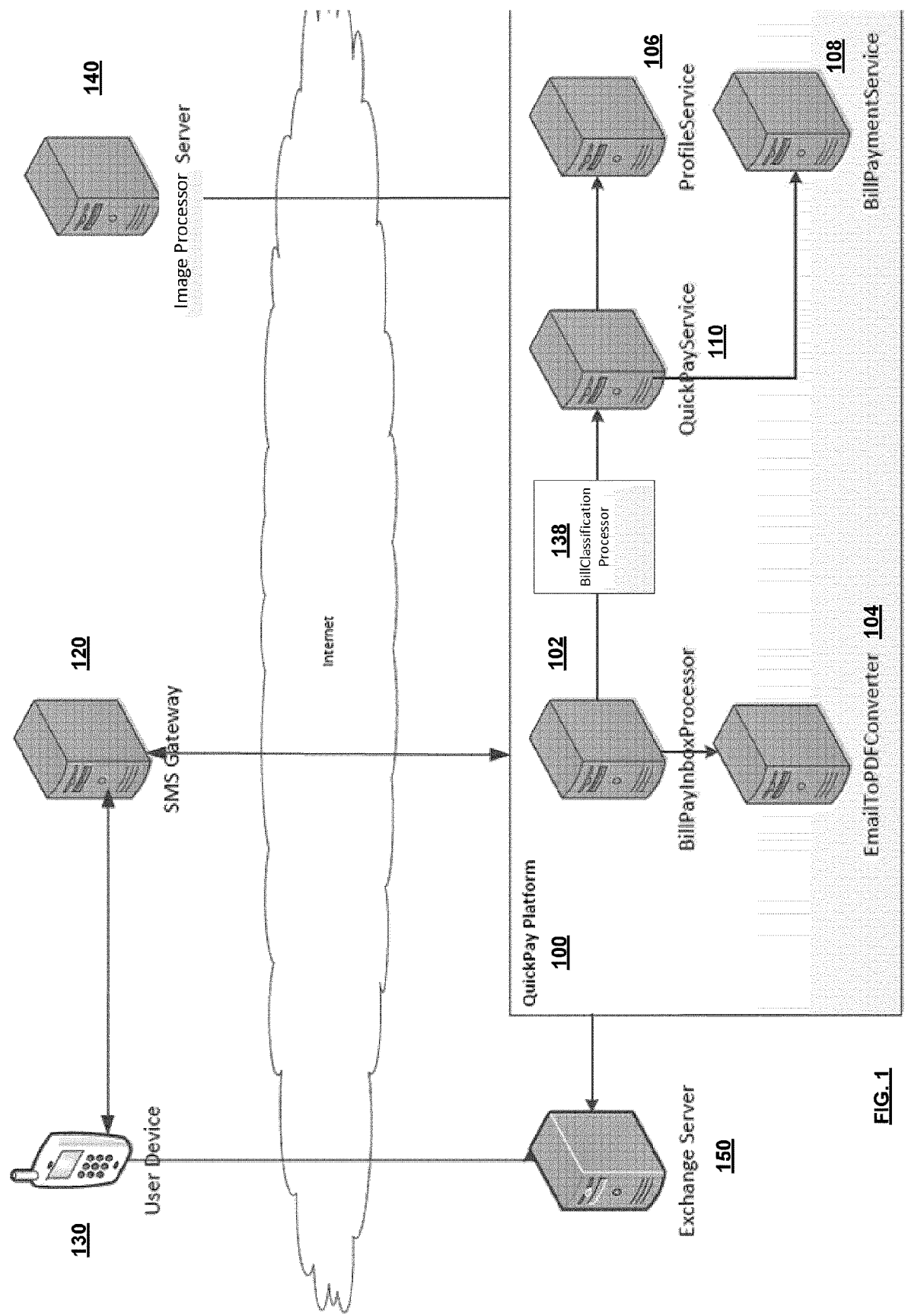
FIG. 1 shows a QuickPay platform according to some embodiments.

FIG. 1 shows a QuickPay platform 100 configured to automatically process bill or invoice statements for customers using electronic messages according to some embodiments. The QuickPay platform 100 provides a mechanism for customers to pay for bills that they receive outside regular bank or payment channels using different electronic addresses.

QuickPay platform 100 has non-transitory computer-readable storage medium with computer-executable instructions for causing a processor to receive a payment request from a first electronic address. The payment request can be received from Exchange Server 150, for example. QuickPay platform 100 can verify the first electronic address to retrieve a customer record using QuickPay Service 110 and Profile Service 106. QuickPay platform 100 can transmit the payment request to a data extraction process which can be implemented by EmailtoPDF Converter 104 and/or Image Processor Server 140, for example, and receive extracted payment data.

In some embodiments, QuickPay platform 100 automatically categorizes images or documents using Bill Classification Processor 138. In some embodiments, QuickPay platform 100 automatically extracts data from images or documents or files received as part of the payment request. QuickPay platform 100 connects or integrates with image processor server 140. In some embodiments, image processor server 140 can be incorporated as part of the platform 100 and, in other embodiments, image processor server 140 can be separate from the platform 100. Bill Classification Processor 138 can also be incorporated as part of the QuickPay platform 100.

Bill Classification Processor 138 can use a predictive model for categorizing an image as being a bill or invoice statement. Bill Classification Processor 138 can build the predictive model using a small set of data (e.g. images of bill or invoices statements) and limited computing resources. Image processor server 140 can use a reverse training process to train the predictive model using images that are not bills. The predictive model can identify and categorize images as being of bill or invoice statements or categorize as "a bill" or "not a bill". A bill or invoice statement is an example document and other documents can be used in different embodiments.

Image processor server 140 can extract data values from the images of bills, for example. Image processor server 140 can extract payment data values from data received as part of the payment request. Image processor server 140 can read or process images of bills to extract data values or payment data. Image processor server 140 can determine key values using machine learning models and a reference document database. The reference document database can include a vocabulary or ontology of key words. The reference document data can include document templates, for example. In some embodiments, the image processor server 140 can extract payment data values from the payment request by:

cleaning the image and categorizing the image as a bill using the predictive model. Image processor server 140 can read the content of the image identified as a bill to extract key values. Bill Classification Processor 138 can classify or categorize the image as a bill prior to data extraction. This may conserve resources as not all images are processed using Image processor server 140, e.g. only those categorized as being a bill.

Bill Classification Processor 138 can self-train the predictive model using the image categorized as being a bill based on a level of confidence for the categorization. For example, if the level of confidence falls within a defined range then the image can be used for training. Not all images that are processed are used for training in order to conserve computing resources. For example, images with a level of confidence over 90% might not be used for training, in some examples.

In some embodiments, the image processor server 140 or Bill Classification Processor 138 can train the predictive model used to categorize an image. The training can involve creating image variations of a first image by electronically modifying the first image using different image adjustments. This can also involve discarding empty space in the first image and the image variations by cropping the first image, segregating the first image and the image variations into different sections based on content and format, and storing the processed first image and the image variations into a repository of images. In some embodiments, the image adjustments are selected from the group of contrast, brightness, and pixels.

Bill Classification Processor 138 does an initial categorization of the image as "bill" or "no-bill". In some embodiments, Bill Classification Processor 138 can train the predictive model using images that are bills and images that are not bills. The predictive model can categorize an image as being a bill or a not bill by cleaning the image and processing the cleaned first image using a neural network to identify format attributes. In some embodiments, the format attributes can be company logo, header, boxes, sections, alignment of text fields, and so on.

In some embodiments, training the predictive model uses a reverse training as there may be a limited number of images of bills available to use. The reverse training process can use a greater number of images that are not bills than of images that are bills.

To categorize images, Bill Classification Processor 138 can generate one or more "not a bill" models for the predictive model. For example, images that do not have a logo or account information can be used as a non-bill for training. Another example is a rewards statement that may look like a bill but may not have features of a bill such as an amount due and a due date. These images can be used for the "not a bill" model. Image processor server 140 can use a reverse training mechanism to train the predictive model with a greater number of images of documents that are not bills and less images of documents that are bills. This may be beneficial because there may be a limited number of images of documents that are bills as compared to a vast or large number of images of documents that are not bills. Images of bills are limited and images of non-bills are plentiful so the image processor server 140 can take advantage of the discrepancy using the reverse training mechanism. The image processor server 140 can use 3 or 4 models for non-bills to train the predictive model. The reverse training process is the process to train the model(s) with image of non-bills.

Image processor server 140 or Bill Classification Processor 138 can continue to train the predictive model with new images using a moving average logic, for example. An image can be used for self-training if it is categorized as a bill within a confidence threshold and passes data extraction, for example. Other training parameters can also be used for self-training.

Image processor server 140 or Bill Classification Processor 138 can train the predictive model to categorize an image. For example, image processor server can train the predictive model by creating image variations of the image by electronically modifying the image using different image adjustments. The image adjustments can be contrast, brightness, and pixels, orientation, greyscale, black and white, blur, DPI, bit colors, for example. Image processor server 140 can discard empty space in the image and the image variations by cropping the image. Image processor server 140 can segregate the first image and the image variations into different sections based on content and format. Image processor server 140 can store the processed image and the image variations into a repository of images.

For example, image processor server 140 can create 15 to 20 image variations of the image by adjusting different image factors such as contrast, brightness, pixel, orientation, greyscale, black and white, blur, DPI, and bit colors (8, 12) of the images. This is an example range and the number of image variations can vary depending on the factors used to make the adjustments. The image processor server 140 can discard empty spaces in each image by cropping it. Image processor server 140 segregates the image into different sections based on its content and format. For example, image processor server 140 segregates the image based on logos, headers, boxes, text, numbers, coordinates, location of landmarks, and so on. The image processor server 140 captures and stores different formats and layouts of images in order to build a repository of images to train the model. For example, biller A can have a logo and used a specific bill layout. This can be used to train the model to identify bills by biller A, for example.

Bill Classification Processor 138 and image processor server 140 implement different stages of document processing. Bill Classification Processor 138 cleans the image and identifies or categorizes it as a bill or not a bill. The image processor server 140 reads the content of the image identified as a bill to extract key values. Image processor server 140 self-trains the predictive model using the image identified as a bill to improve model accuracy. Image processor server 140 can implement error and exception handling.

At an initial stage, Bill Classification Processor 138 cleans the image for processing. Bill Classification Processor 138 uses the predictive model to categorize the image as a bill or not a bill based on a level of confidence and predefined threshold. If the predictive model identifies the image as a bill then the Bill Classification Processor 138 checks the level of confidence against the predefined threshold. If the level of confidence for the image categorization is above a first predefined threshold then the image moves to a subsequent processing step. If the level of confidence for the image categorization is below a second predefined threshold and the image is identified as a bill then the image processor server 140 stores this image in a separate database or repository to continue to self-train the predictive model. The self-training can increase the accuracy of image categorization or document processing. For example, the Bill Classification Processor 138 can store images identified as a bill and categorized with a level of confidence between 50% to 90%. In this example, 50% can be a first predefined threshold and 90% can be a second predefined threshold. There may be diminishing returns in training the predictive model using images categorized as a bill with a level of confidence over 90%. Not using these images for training can save computing resources. Image processor server 140 or Bill Classification Processor 138 conserves resources by only continuously self-training on images of documents that are categorized as a bill with a level of confidence over 50% and under 90%, in this example. Bill Classification Processor 138 server 140 can store images of documents identified as not being a bill in a "not a bill" database or data set. Bill Classification Processor 138 can check the level of confidence for the image categorized as "not a bill" against a threshold (50% to 90% for example) prior to training. Bill Classification Processor 138 can train using the "not a bill" dataset when the confidence is between 50%-90%, or else the image can be discarded. Bill Classification Processor 138 can train using the "not a bill" dataset and the "bill" dataset.

QuickPay platform 100 can implement an authentication framework that involves: input, automated interpretation, automated decision or rule, and action. There can be different example implementations for these components.

For example, the QuickPay platform 100 can receive different types of input for the payment request. An example input is email where the image or document is emailed as attachment, or email contains all billing information. Another example input is an API and a direct call containing the required information from an external system, a vendor system, and so on. For this example, a biller or vendor could call the API containing the billing information for a customer (instead of a customer emailing the bill to start the payment process). Another example is voice Input and the QuickPay platform 100 can get input/instructions via voice commands and other customized voice APIs. Other sources of input can be RFID tags/stickers containing instructions for a payment can be used as input with billing instructions. A further example input is unique links and the QuickPay platform 100 could be triggered by a customer by activating a unique link with hashed information to load the instructions into QuickPay platform 100 for interpretation. For this example, an http link with parameters passed in as part of a query string to initiate the payment process.

The QuickPay platform 100 can interpret data using different implementations, and a combination of different processes. For example, QuickPay platform 100 can use a combination of prediction models. An example is a machine learning prediction component that uses a limited/fixed computing resource to build a predictive model to identify and categorize documents/images. The QuickPay platform 100 can use a reverse training mechanism i.e. train the model with more documents/images that are 'Not bills' and less number of 'Bills'. The QuickPay platform 100 can self-train the model with new documents/images using a moving average logic or confidence threshold. Another example is a machine learning extraction component for document reading to extract key values or key/value pairings. A further example involves integration with natural language processing. Multiple models can be integrated and used together to decrease the business risk threshold. For example, the QuickPay platform 100 can use 3+ models combined with each confidence interval to determine if system should process. The QuickPay platform 100 can apply rules against the interpretation to automate decision making. The QuickPay platform 100 can define acceptable risk levels based on the prediction models used. The QuickPay platform 100 can leverage out of band communications as a substitute for authentication. The QuickPay platform 100 can execute the appropriate action based on the decision. The QuickPay platform 100 can loop back the command selected by the customer to enhance the models. For example, the QuickPay platform 100 can capture the response back from the customer if the customer replies 'PAY'. QuickPay platform 100 can assume that the model is correct and the information extracted is correct and use it to reinforce the response. If the customer response is 'Null', then QuickPay platform 100 can assume that the information is wrong and can use this information to train the model. The customer can also reply 'NO' to cancel the request, and this information will also be used to train the model.

QuickPay platform 100 can generate a vendor payment request using the extracted payment data based on a vendor format (e.g. that can be managed by Profile Services 106). The extracted payment data can indicate a vendor identifier linked to the vendor format. QuickPay platform 100 can transmit a payment confirmation request to a second electronic address linked to User Device 130 using SMS Gateway 120, for example. The second electronic address can be stored in the customer record managed by Profile Server 106. QuickPay platform 100 can receive an approval notification in response to the payment confirmation request from the second electronic address and User Device 130. QuickPay platform 100 can transmit the vendor payment request via Bill Payment Server 108 and receive a payment confirmation indicating successful processing of the vendor payment request. QuickPay platform 100 can update a payment record with the payment confirmation and the extracted payment data. The payment record can indicate a customer identifier linked to the customer account. Profile Services 106 can manage customer profiles or records and vendor profiles or records.

In some embodiments, the QuickPay platform 100 has an electronic wallet application having non-transitory computer-readable storage medium with computer-executable instructions for causing a processor of the User Device 130 to trigger the display of the payment confirmation request on a display of the User Device 130. The electronic wallet application can receive the approval notification in response to the display of the payment confirmation request at the User Device 130. The electronic wallet application can transmit the approval notification to the QuickPay platform 100. In some embodiments, the electronic wallet application is further configured to authorize a customer account prior to receiving the approval notification. In some embodiments, the electronic wallet application is further configured to capture an image of a bill or statement and/or transmit the image.

In some embodiments, QuickPay platform 100 can process a registration request to store the first electronic address in the customer record to permit processing of the initial payment request. In some embodiments, QuickPay platform 100 can determine that the customer record does not indicate bill payment registration and transmit a registration request to the second electronic address stored in the customer record. The registration request indicating that the initial payment request was received from the first electronic address to provide an indication to the customer.

In some embodiments, the first electronic address is for a different communication channel or band than the second electronic address. For example, the Exchange Server 150 can be used for one channel of communication and the SMS Gateway 120 can be used for another channel of communication. In some embodiments, the first electronic address is an email address and the second electronic address is an SMS address.

In some embodiments, the customer record indicates a payment account and the vendor payment request indicates the payment account. In some embodiments, the approval notification indicates a payment account identifier linked to the payment account. In some embodiments, the approval notification indicates a code that is linked to a code in the customer record. The code can be used as an additional layer of security.

In some embodiments, the initial payment request indicates a payment amount, a payment due date, vendor identifier, and vendor account identifier. In some embodiments, the vendor payment request indicates a payment amount, a payment due date, vendor identifier, a vendor account identifier, and a payment account.

In some embodiments, QuickPay platform 100 determines if the initial payment request is a duplicate request using historical payment records. Upon determining that the initial payment request is a duplicate, QuickPay platform 100 can indicate the detected duplicate in the payment confirmation request, such as "This is a duplicate request. Do you still want to proceed?".

In some embodiments, the initial payment request indicates a payment amount and a payment due date, the payment due date being a future date. QuickPay platform 100 can hold the vendor payment request until the future date.

In some embodiments, QuickPay platform 100 can determine that the an initial payment request is a recurring request using historical payment records linked to a customer identifier indicated in the customer record. The recurring request indicating a recurring time period such as a monthly payment (e.g. 15$^{th}$ of each Month) to the same vendor for the same payment amount. QuickPay platform 100 can transmit another payment confirmation request to the second electronic address for the recurring time period, such as prior to the 15$^{th}$ of the following month to request confirmation of another payment. In some embodiments, QuickPay platform 100 can transmit a recurring payment confirmation to the second electronic address requesting an approval of multiple payments at the recurring time period (e.g. please confirm payment of X amount to Vendor Y for the Z of each Month for N months). QuickPay platform 100 can receive another approval notification in response to the payment confirmation request from the second electronic address. QuickPay platform 100 can transmit another vendor payment request for the recurring time period (or multiple for the multiple recurring payment example). For each vendor payment request, QuickPay platform 100 can receive another payment confirmation indicating successful processing of the other vendor payment request. QuickPay platform 100 can update the payment record with the other payment confirmation.

Accordingly, the improved payment process can involve QuickPay platform 100 receiving an electronic message with a payment request from user device 130 (e.g. operated by customer) via Exchange Server 150. The electronic message with the payment request can indicate data relating to a bill or invoice statement, such as a customer or vendor account identifier, payment amount, payment date, and so on. The electronic message can include an image of a bill or invoice statement, for example. The QuickPay platform 100 automatically processes the electronic message with the payment request by extracting the data relating to the bill or invoice statement using Image Processor Server 140 to tokenize the extracted content according to a biller or issuer format. The QuickPay platform 100 can integrate a Bill Pay Inbox Processor 102, EmailToPDF Convertor 104, QuickPay Service 110, Profile Service 106 to automatically process the payment request. The QuickPay platform 100 can connect or integrate with Image Processor Server 140 to extract data values. The QuickPay platform 100 can transmit a notification of the payment request for confirmation to user device 130 via SMS Gateway 120. The SMS Gateway 120 is an example of a different channel for communication with user device 130 than Exchange Server 150, which can provide security, for example. The QuickPay platform can generate a digital fingerprint of activity to detect duplicate payment requests. If a duplicate payment request is detected then the QuickPay platform 100 can generate a notification message to prompt the customer to confirm that they want to process a duplicate payment request. The digital fingerprint can include different data entries such as existing customer behavior for each bill i.e. the time of payment, bill payment amount trend over time, the frequency, the historical average of bill payments and the technology or device used to pay this bill. If the person acts out of the regular zone, then it can be used to mark fraudulent payments and trigger an alert.

A customer can forward or send the email with an image of the bill to QuickPay platform 100 (via Exchange Server 150) using User Device 130 as an electronic message with a payment request. The email with the bill can contain the vendor or issuer name, customer or account identifier, payment amount, and payment due date. The QuickPay platform 100 can be associated with one or more electronic addresses, such as Quickpay@bank.com, for example. The user device 130 can send the electronic message to the electronic address for the QuickPay platform 100. The electronic address can be used by multiple customers or can be unique for each customer, for example. The electronic message can indicate a sender address which can be associated with the customer. In some embodiments, the user device 130 can send a voice command to the QuickPay platform 100 to initiate the payment process and generate a payment request. The voice command can be linked to a customer electronic address. In some embodiments, the user device 130 can be a virtual reality device and can send a command from a virtual world to the QuickPay platform 100 to initiate the payment process and generate a payment request. Other commands workflows can be used to initiate the payment process and generate a payment request.

Before sending the electronic message with the payment request the customer can register their electronic address as part of a customer profile managed by Profile Service 106. The electronic address can be associated with a first electronic communication channel. The customer profile can also indicate a payment verification address as part of the customer profile. The payment verification address can be associated with a second electronic communication channel (e.g. a different electronic communication channel than the electronic communication channel used to submit payment requests) for security. For example, the payment verification address can be an SMS number. The customer profile can be linked to a bank account profile or indicate another payment account, such as a credit card account or stored value card account. The payment verification address can be confirmed by sending a verification message. The QuickPay platform 100 can verify that the electronic address for submitting payment requests is not an existing address stored in another customer profile or otherwise a duplicate address. The QuickPay platform 100 can use the payment verification address to send an out of band communication for verification prior to processing of the payment. The verification message can indicate a payment account identifier, in some embodiments. The payment account identifier can be used to retrieve payment account data stored in the customer profile.

Figure 2:
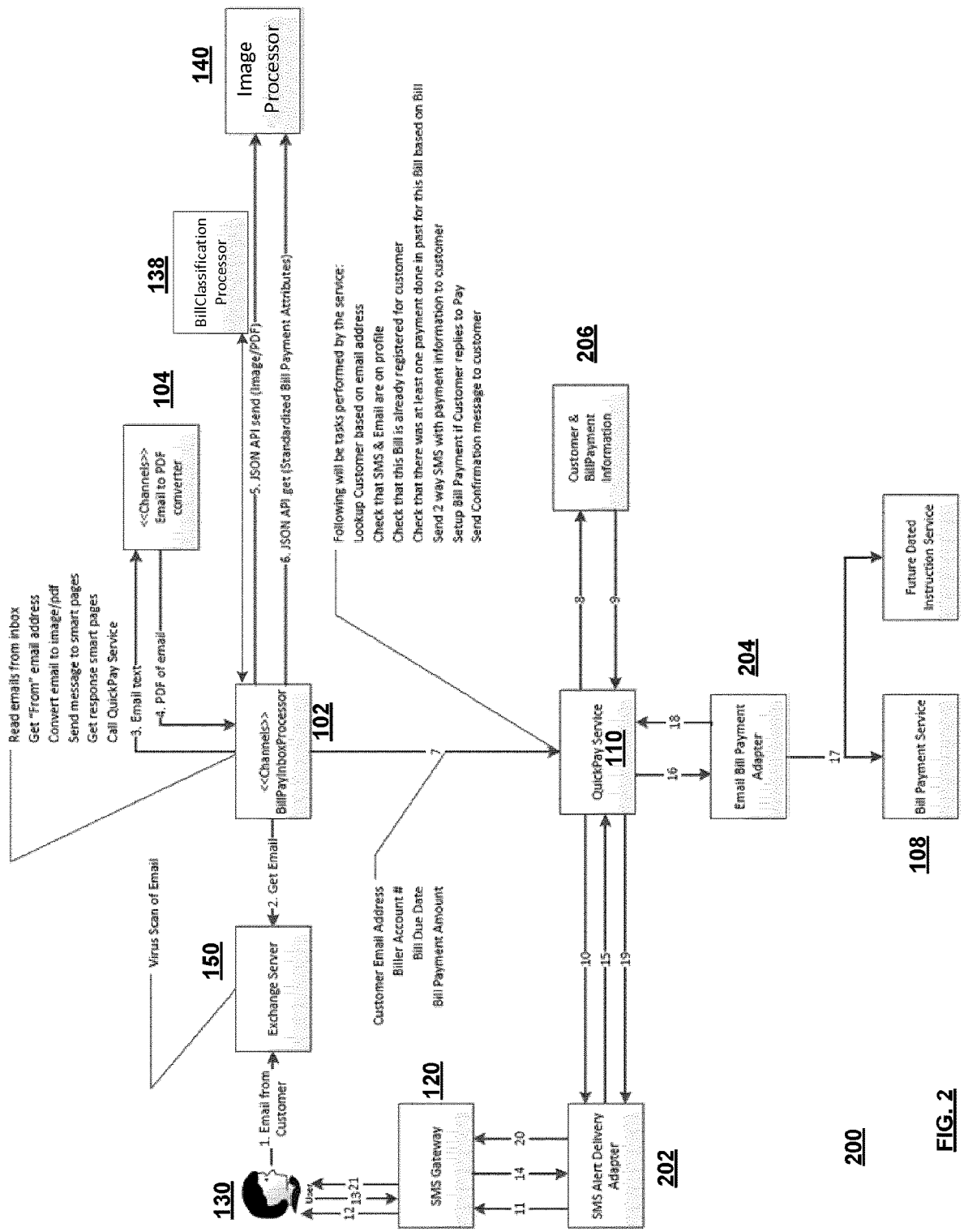
FIG. 2 shows a dataflow diagram for a QuickPay platform according to some embodiments.

FIG. 2 shows a dataflow diagram for a QuickPay platform 100 according to some embodiments.

The User Device 130 transmits an electronic message with a payment request to Exchange Server 150 using an electronic address linked to the QuickPay platform 100. The electronic message with the payment request can indicate data relating to a bill or invoice, such as a customer or account identifier, payment amount, payment date, and so on. The Exchange Server 150 can implement a virus scan on the received electronic message with the payment request.

The Bill Pay Inbox Processor 102 retrieves the electronic message with the payment request. The Bill Pay Inbox Processor 102 processes the electronic message to extract a sender address. The Bill Pay Inbox Processor 102 can convert the electronic message into another format, such as an image or PDF, using the EmailToPDF Convertor 104, for example. The Bill Pay Inbox Processor 102 can transmit the electronic message in a first format to the EmailToPDF Convertor 104 and receive an image or PDF of the electronic message in response.

The Bill Pay Inbox Processor 102 initiates a data categorization operation using Bill Classification Processor 138. The Bill Classification Processor 138 can categorize the image as being a bill or not a bill with a corresponding level of confidence. The Bill Classification Processor 138 can use a predictive model to categorize the image as a bill.

Upon categorizing the image as being a bill, the Bill Pay Inbox Processor 102 initiates a data extraction from the electronic message with the payment request by sending an extraction request to the Image Processor Server 140 via an application programming interface (API). The extraction request can include the image or PDF of the electronic message along with a biller or issuer identifier. The Image Processor Server 140 can tokenize the extracted content according to a biller or issuer format linked to the biller or issuer identifier. The tokenized data can be received by the Bill Pay Inbox Processor 102 using an API function get (Bill Payment Attributes). The tokenized data (e.g. Bill Payment Attributes) can include customer electronic address, biller account identifier or number, bill payment due date, bill payment amount, and so on. Image Processor Server 140 can process an image to extract key values. Image Processor Server 140 can use a predictive model to extract the key values. Image Processor Server 140 can self-train the predictive model using the image based on the level of confidence of categorizing the image as a bill. Image Processor Server 140 can build the predictive model using a reverse training process.

The Bill Pay Inbox Processor 102 transmits the tokenized data to the QuickPay Service 110 to process the payment request. The QuickPay Service 110 retrieves the customer profile from the Customer and Bill Payment Information 206 using the customer electronic address. The QuickPay Service 110 verifies that the customer electronic address and verification electronic address are indicated in the customer profile. The QuickPay Service 110 verifies that the bill or invoice is registered in the customer profile using the Customer and Bill Payment Information 206. The QuickPay Service 110 checks to see if there are historical records of payments to the biller or issuer, and whether this is a duplicate payment request using the Customer and Bill Payment Information 206. In some embodiments, QuickPay Service 110 checks to see if there is a least one payment in the past to the biller or issuer using the biller account number or identifier.

The QuickPay Service 110 can transmit a verification request for the payment to the payment verification address. For example, the payment verification address can be an SMS number linked to the user device 130. The QuickPay Service 110 can transmit the verification request to user device 130 via the SMS Alert Delivery Adapter 202 and SMS Gateway 120. The SMS Gateway 120 is an example of a different channel for communication (e.g. out of band communication) with user device 130 than Exchange Server 150, which can provide security, for example.

The user device 130 can display the verification request at an interface application. The verification request can indicate a vendor identifier and payment amount, for example. The verification request can include a selectable indicia or code for confirming or verifying the payment request. The interface application can be a mobile wallet application, for example, or a messaging service, as another example. The user device 130 can receive confirmation of the verification request and transmit a confirmation message to the QuickPay Service 110 via the SMS Alert Delivery Adapter 202 and SMS Gateway 120.

The QuickPay Service 110 is configured set up the bill payment in response to receiving confirmation of the verification request or confirmation message. The QuickPay Service 110 can set up the bill payment by transmitting the payment request to the Bill Payment Adaptor 204 and the Bill Payment Service 108. The Bill Payment Service 108 can transmit the payment request to a vendor system. The Bill Payment Adaptor 204 can convert or transform the payment request into a format compatible or readable by vendor system, based on vendor attributes managed by Bill Payment Information 206. The Bill Payment Service 108 can receive a payment confirmation or electronic receipt from vendor system and can relay the payment confirmation to the QuickPay Service 110 via the Bill Payment Adaptor 204. The QuickPay Service 110 can transmit a notification of the payment confirmation to the User Device 130 via the SMS Alert Delivery Adaptor and the SMS Gateway 120. As noted, in some embodiments, the User Device 130 can have an electronic wallet application and the QuickPay Service 110 can trigger the display of the notification of the payment confirmation at the electronic wallet application.

The QuickPay Service 110 can store the payment confirmation at the Customer and Bill Payment Information 206 to maintain a payment history record. The payment history record can be used by the QuickPay Service 110 to flag duplicate requests or past payments, which may be an indicator of fraud activity, for example. In some embodiments, the payment request can indicate a payment date that is at a future date. This can be referred to as a future payment date. The customer can indicate the future payment date or the QuickPay Service 110 can automatically generate the future payment date based on the payment due date extracted from the statement or based on historical payment data (e.g. in the past the customer previously paid the bill on the $15^{th}$ of each month). If the QuickPay Service 110 automatically generates the future payment date then the QuickPay Service 110 can transmit the future payment data as part of the payment confirmation request for transmission to user device 130. The Bill Payment Service 17 can hold or queue the payment request until the future payment date using the Future Dated Instruction Service. The Bill Payment Service 17 can use an alert to trigger payment when the current data becomes equal to the future payment date. The QuickPay Service 110 can store the future payment date at the Customer and Bill Payment Information 206 as part of the customer payment record. This can be used to automatically generate a future payment data for another payment request and to track historical data.

Figure 3:
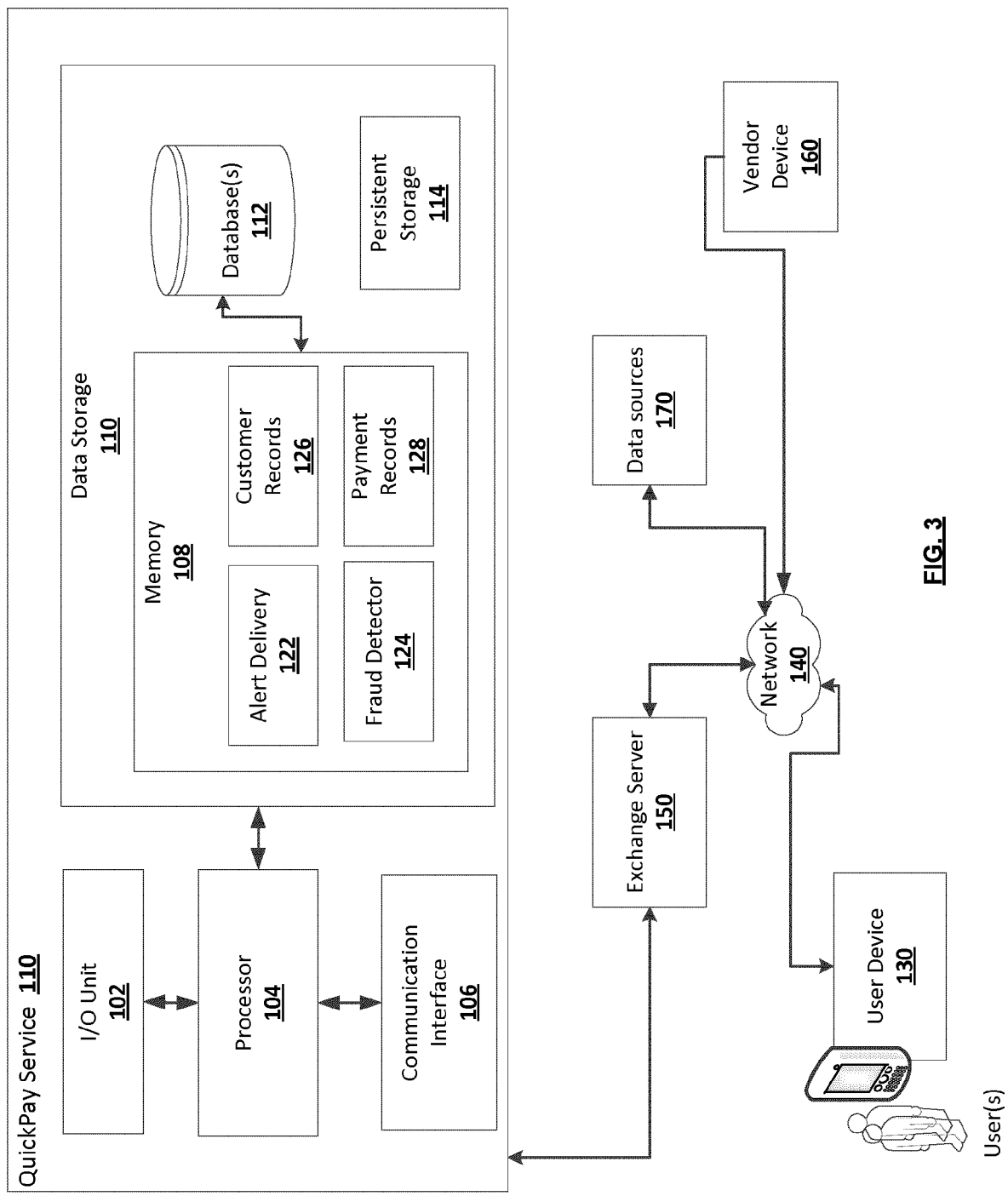
FIG. 3 shows a QuickPay service according to some embodiments.

FIG. 3 shows a physical environment of a QuickPay service 110 according to some embodiments. The QuickPay service 110 can implement aspects of the processes described herein.

The QuickPay service 110 connects to interface application at User Device 130, Exchange Server 150, vendor device 160 and data sources 170) using network 140. Data sources 170 can interact with the QuickPay service 110 to provide input data for storage in data storage 110. Network 140 (or multiple networks) is capable of carrying data and can involve wired connections, wireless connections, or a combination thereof. Network 140 may involve different network communication technologies, standards and protocols, for example. The interface application can be installed on user device 130 (e.g. as part of a digital wallet application) to display an interface of visual elements that can represent payment alerts, for example.

The QuickPay service 110 can include an I/O Unit 102, a processor 104, communication interface 106, and data storage 110. The processor 104 can execute instructions in memory 108 to implement aspects of processes described herein. The processor 104 can execute instructions in memory 108 to configure alert delivery 122, fraud detector 124, customer records 126, payment records 128, and other functions described herein. The QuickPay service 110 may be software (e.g., code segments compiled into machine code), hardware, embedded firmware, or a combination of software and hardware, according to various embodiments.

The QuickPay service 110 service receives the payment request from Exchange Server 150 or Bill Pay Inbox Processor 102. The payment request can include payment data extracted from an electronic invoice or bill statement, including customer identifier, customer's initial payment request address (e.g. an electronic address linked to the customer that the initial payment request and electronic invoice or bill statement was received from), customer data, vendor data, payment amount, payment due date, and so on. The payment request can be in a format specific to the vendor (e.g. as generated by Bill Pay Inbox Processor 102) or can be a general format that can be converted to a format specific to the vendor (e.g. by Bill Payment Service 108 or QuickPay Service 110).

The QuickPay service 110 can lookup customer data using customer records 126 upon receiving a payment request (e.g. from Bill Pay Inbox Processor 102 or Exchange Server 150) to identify an internal customer identifier or account number to associate with the payment request. For example, the payment request can indicate an email address associated with a customer and the QuickPay service 110 can retrieve a customer record 126 using the email address. Other customer lookup data can be used, such as a customer name, address, vendor or bill account number, and so on.

The customer record 126 can indicate contact data for the customer, including contact data for another channel of communication. For example, the email address can be a first channel of communication and SMS data can a second channel of communication for the customer. The initial payment request contact address can be a first channel of communication and the verification request contact address can a second channel of communication for the customer. The payment request contact address and the verification request contact address can be stored as contact data in the customer record 126. The QuickPay service 110 can verify that at least two electronic contact addresses are saved as part of a customer record prior to processing the payment request. The electronic contact addresses can be collected and saved to customer record 126 as part of a registration process, for example. The alert delivery 126 can transmit a payment verification request to the user device 130. As noted, the alert delivery 126 can transmit a payment verification request to the user device 130 using the verification request contact address stored in the customer record 126, which can be a different communication channel than the initial payment request contact address. The QuickPay service 110 can receive a confirmation response to the payment verification request approving or denying the payment request. In some embodiments, the confirmation response can indicate a payment account that the QuickPay service 110 can cross-reference to the customer account 126. For example, the payment account may indicate "pay with credit card" or "pay with chq account" and the customer record 126 can include account identifiers for the payment accounts. The QuickPay service 110 can update the payment request based on the payment account data.

If the confirmation response approves the payment request then the alert delivery 126 can transmit the payment request to Exchange Server 150 and/or Bill Payment Service 108. The QuickPay service 110 can convert or transform the payment request to a format specific to the vendor device 170 or the payment request can be converted to a format specific to the vendor device 170 by Bill Payment Service 108. The QuickPay service 110 can receive a payment confirmation in response to the payment request from the Exchange Server 150 and/or Bill Payment Service 108. The QuickPay service 110 updates the payment record 128 with the payment request. The alert delivery 126 can transmit the payment confirmation to the User Device 130 as a confirmation message. The QuickPay service 110 can send a payment request to the Exchange Server 150 and/or Bill Payment Service 108 with a future payment date which can in turn hold or queue payment until the future payment date. In some embodiments, the QuickPay service 110 can hold or queue payment until the future payment date.

The customer record 126 can indicate whether a specific customer is registered for bill payment by QuickPay service 110. If the customer record 126 is associated with an email address or other customer lookup data and the customer record 126 indicates that the customer is not registered for bill payment by QuickPay service 110 then the alert delivery 122 can transmit a registration request to the customer using contact data stored in the customer record 126. This can be contact data for a different channel of communication than the initial payment request contact address to add a security measure.

The QuickPay service 110 can check to payment records 128 to see if there is a least one past payment done from the customer to the issuer of the bill or invoice statement or the vendor. A payment record 128 can indicate a payment date, payment amount, invoice identifier, customer identifier, vendor identifier, and so on. Each payment record 128 may include a payment receipt identifier that may be stored as part of a customer record 126, for example, to provide a listing or collection of payment records 128 associated with a given customer. As another example, each payment record 128 can indicate a customer identifier that can be indexed to a customer identifier of a customer record 126. The QuickPay service 110 can use the customer identifier to generate a dynamic list of all payment records 128 corresponding to a given customer. If there is not at least one past payment done from the customer to the issuer of the bill or invoice statement or the vendor, then the alert delivery 122 can transmit a notification to the user device 130 for verification of the vendor, for example.

The QuickPay service 110 can use the vendor identifier to generate a dynamic list of all payment records 128 corresponding to a given vendor for transmission to vendor device 170, for example. In some embodiments, the vendor device 170 may provide its listing to QuickPay service 110 for verification and to flag fraudulent activities, for example, in the event a payment record 126 indicates payment to the vendor that was not received or tracked at vendor device 170. The QuickPay service 110 can provide data linked to flagged fraudulent activities to fraud detector 124 to detect related activities that may also be potentially fraudulent. In some embodiments, the vendor device 170 can verify the listing against their own records to flag fraudulent activities.

The fraud detector 124 can generate a digital fingerprint of payment activity (e.g. payment request and/or payment confirmation) to detect duplicate payment requests or payment confirmations. This can be implemented upon receiving an incoming payment request and prior to sending to the user device 130 before requesting confirmation or verification. In some embodiments, this can be implemented before sending the payment request to Bill Payment Service for payment to the vendor device 160, for example. If a duplicate payment request is detected then the alert delivery 122 can generate a notification message to prompt the customer to confirm that they want to process a duplicate payment request.

The I/O unit 102 can enable the platform 100 to interconnect with one or more input devices, such as a keyboard, mouse, camera, touch screen and a microphone, and/or with one or more output devices such as a display screen and a speaker.

The processor 104 can be, for example, any type of general-purpose microprocessor or microcontroller, a digital signal processing (DSP) processor, an integrated circuit, a field programmable gate array (FPGA), a reconfigurable processor, or any combination thereof.

Memory 108 may include a suitable combination of any type of computer memory that is located either internally or externally such as, for example, random-access memory (RAM), read-only memory (ROM), compact disc read-only memory (CDROM), electro-optical memory, magneto-optical memory, erasable programmable read-only memory (EPROM), and electrically-erasable programmable read-only memory (EEPROM), Ferroelectric RAM (FRAM) or the like. Data storage devices 110 can include memory 108, databases 112 (e.g. graph database), and persistent storage 114.

The communication interface 106 can enable the QuickPay service 110 to communicate with other components, to exchange data with other components, to access and connect to network resources, to serve applications, and perform other computing applications by connecting to a network (or multiple networks) capable of carrying data including the Internet, Ethernet, plain old telephone service (POTS) line, public switch telephone network (PSTN), integrated services digital network (ISDN), digital subscriber line (DSL), coaxial cable, fiber optics, satellite, mobile, wireless (e.g. Wi-Fi, WiMAX), SS7 signaling network, fixed line, local area network, wide area network, and others, including any combination of these.

The QuickPay service 110 can be operable to register and authenticate users (using a login, unique identifier, and password for example) prior to providing access to applications, a local network, network resources, other networks and network security devices. The QuickPay service 110 can connect to different machines or entities 150.

The data storage 110 may be configured to store information associated with or created by the QuickPay service 110. Storage 110 and/or persistent storage 114 may be provided using various types of storage technologies, such as solid state drives, hard disk drives, flash memory, and may be stored in various formats, such as relational databases, non-relational databases, flat files, spreadsheets, extended markup files, and so on.

Figure 4:
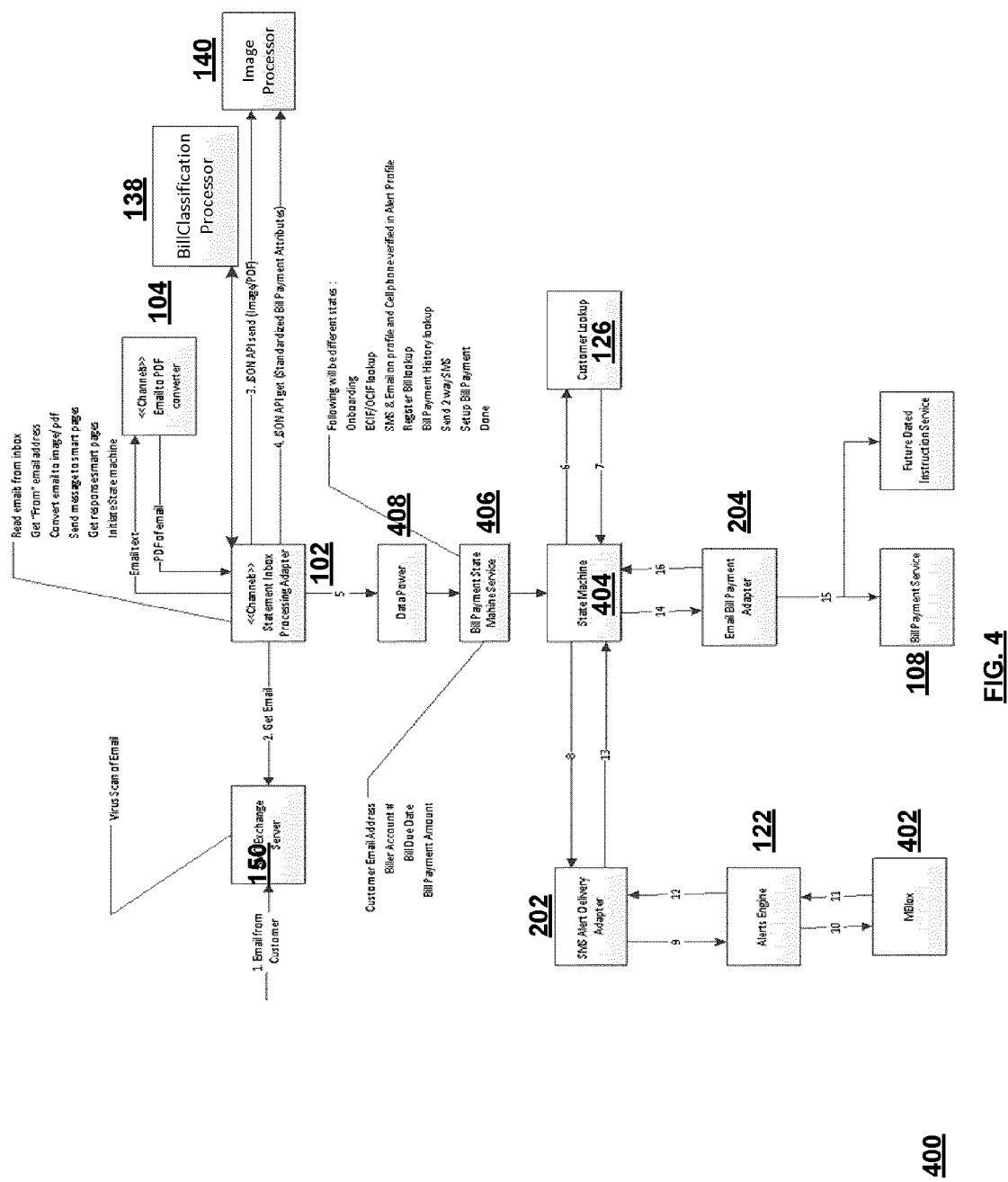
FIG. 4 shows a dataflow diagram for a QuickPay platform according to some embodiments.

FIG. 4 shows a dataflow diagram for a QuickPay platform 100 according to some embodiments. The exchange server 150 receives an initial payment request in the form of an email message from a first electronic address, which is an email address in this example. In some examples, the Statement Inbox Processing Adaptor 102 converts the email message to a PDF file using the Email to PDF converter 104. The Bill Pay Inbox Processor 102 initiates a data categorization operation using Bill Classification Processor 138. The Bill Classification Processor 138 can categorize the image as being a bill or not a bill with a corresponding level of confidence. The Bill Classification Processor 138 can use a predictive model to categorize the image as a bill. Upon categorization as a bill, the Statement Inbox Processing Adaptor 102 extracts payment data from the email message using Image Processor Server 140 and its API to extract payment attributes using a predictive model. The Statement Inbox Processing Adaptor 102 transmits the extracted payment data to Bill Payment State Machine Service 406. The extracted payment data can include the email address, customer or biller account identifier, payment due date, payment amount, vendor identifier, and so on. The Bill Payment State Machine Service 406 can onboard or register a customer and update the customer account to indicate registration for the bill payment service. The customer account can link the registration to the first electronic address, which is email in this example. The Bill Payment State Machine Service 406 verifies the email address and engages a state machine 404 for a customer lookup 126 to retrieve a customer record and check that the customer is registered for the bill payment service. This can involve an ECIF or OCIF lookup using customer records.

The state machine 404 can trigger generation of a vendor payment request using the extracted payment data based on a vendor format. The extracted payment data can indicate a vendor identifier linked to the vendor format for the bill payment attributes to use to generate the vendor payment request.

The state machine 404 can trigger retrieval of a second electronic address for the customer, which can be an SMS address for this example. The SMS Alert Delivery Adaptor 202 and the Alerts Engine 122 transmit a payment confirmation request to a second electronic address linked to mobile wallet application or message service 402. The second electronic address can be stored in the customer record and retrieved using customer lookup 126, for example. The statement machine 404 can receive an approval notification in response to the payment confirmation request from the second electronic address via the SMS Alert Delivery Adaptor 202 and the Alerts Engine 122. The statement machine 404 can transmit the vendor payment request to Bill Payment Service 108 (which may be held for a future date using Future Dated Instruction Service) via Bill Payment Adapter 204. The statement machine 404 can receive a payment confirmation indicating successful processing of the vendor payment request from Bill Payment Adapter 204. The statement machine 404 can update a payment record with the payment confirmation and the extracted payment data. The payment record can indicate a customer identifier linked to the customer account.

Figure 5:
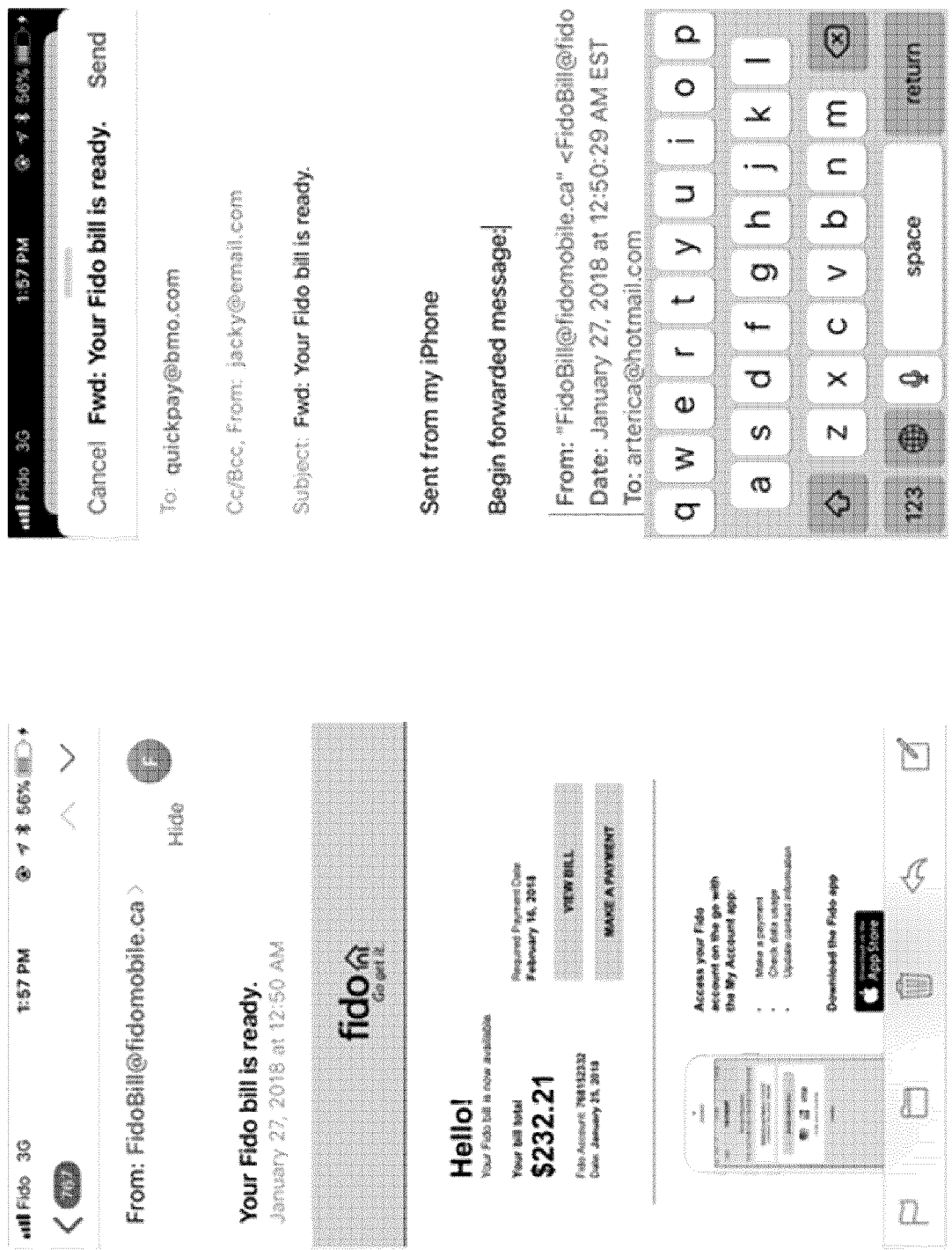
FIG. 5 shows a screenshot of an example interface according to some embodiments.

FIG. 5 shows screenshots 500, 502 of an example interface according to some embodiments. The interface can display at User Device 130, for example. An example screenshot 500 shows an example invoice or bill statement with payment data indicating a vendor identifier, a payment total, a payment due date and a customer account. An example screenshot 502 shows the generation of the initial payment request from a first electronic address to an electronic address linked to the QuickPay platform 100. The initial payment request includes the invoice or bill statement with the payment data.

Figure 6:
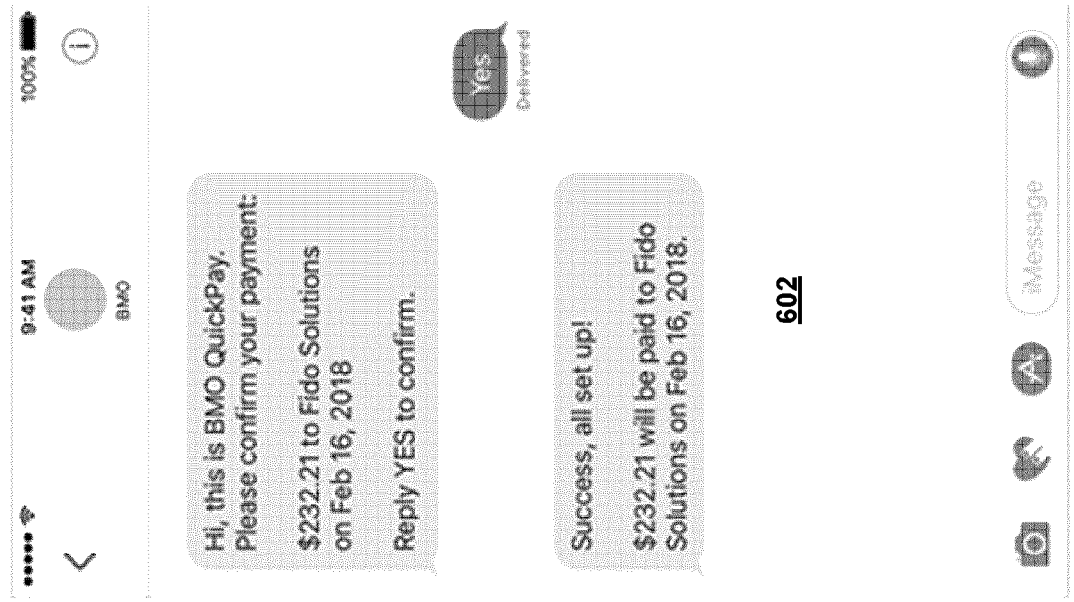
FIG. 6 shows a screenshot of an example interface according to some embodiments.
Figure 6:
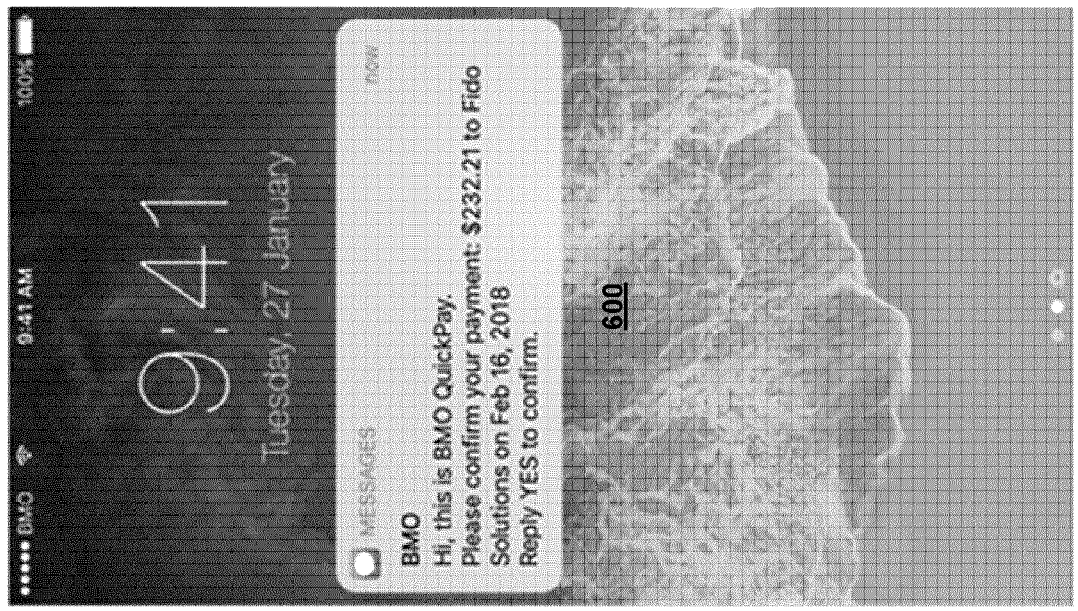

FIG. 6 shows screenshots 600, 602 of an example interface according to some embodiments. An example screenshot 600 shows a payment confirmation request sent to a second electronic address. The payment confirmation request indicates the payment amount, the vendor identifier, and the payment date. The payment confirmation request also indicates an action for generating an approval notification (e.g. REPLY YES TO CONFIRM). An example screenshot 602 shows the payment confirmation request and the approval notification in response to the payment confirmation request from the second electronic address. The screenshot 602 shows confirmation of receipt of the approval notification. The screenshot can update to indicate a payment confirmation indicating successful processing of the vendor payment request once the payment is processed.

Figure 7:
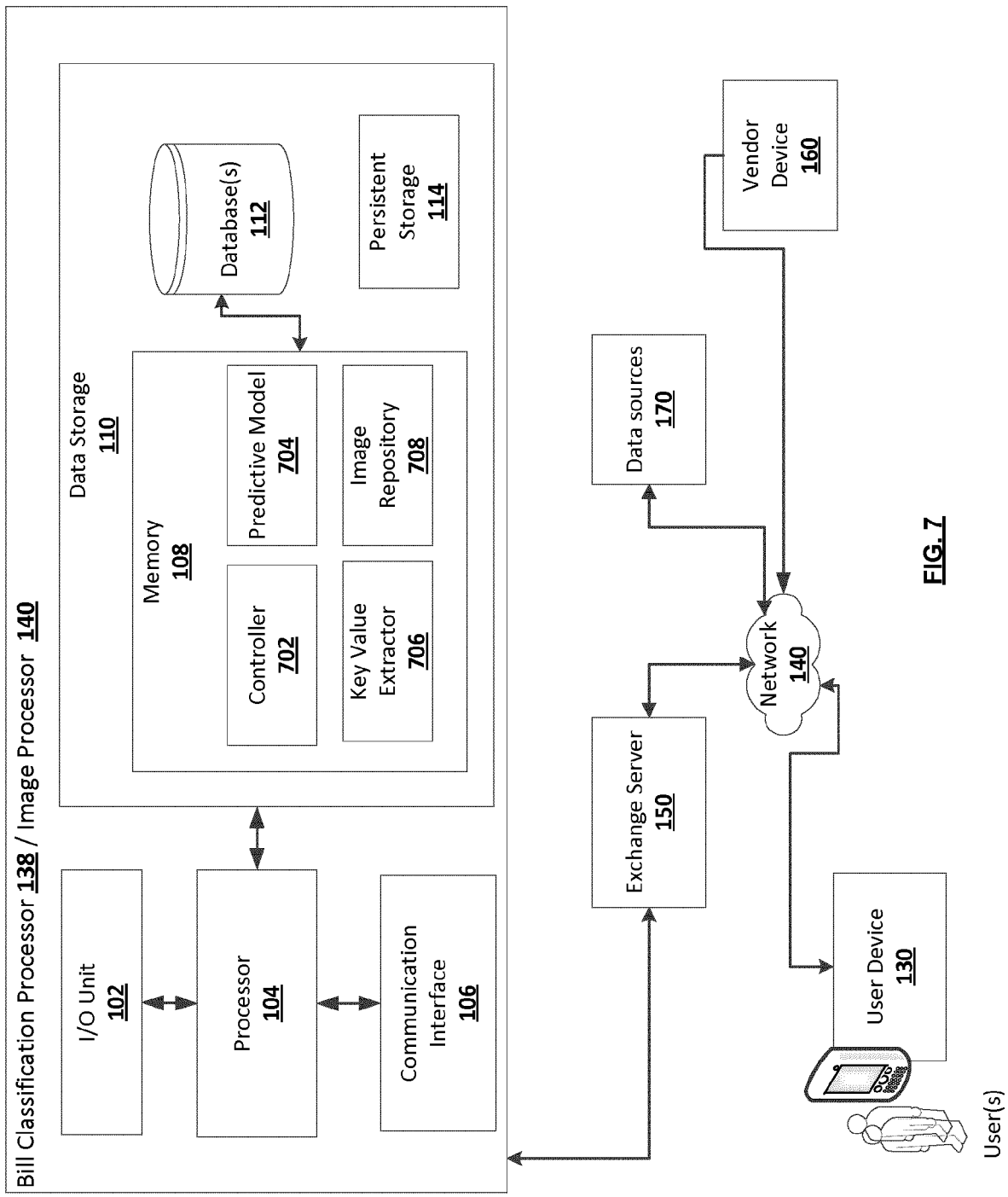
FIG. 7 shows a system diagram for an image processor according to some embodiments.

FIG. 7 shows a system diagram for implementing aspects of bill classification processor 138 or image processor server 140 according to some embodiments. Similar components are shown in and described in relation to FIG. 3, for example. Image processor server 140 includes a controller 702, predictive model 704, key value extractor 706, and an image repository 708. The controller 702 controls different components in order to categorize and process the images. The bill classification processor 138 and image processor server 140 can be implemented using different servers, for example.

Figure 8:
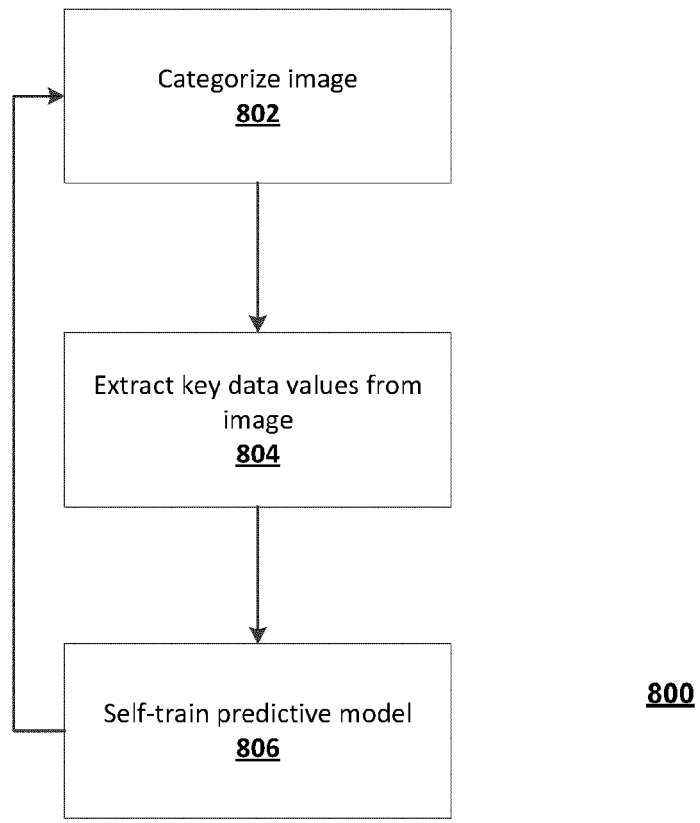
FIG. 8 shows a process according to some embodiments.

FIG. 8 shows a process 800 to categorize images and extract data according to some embodiments. The process 800 can be implemented by bill classification processor 138 or image processor server 140 and the components shown in FIG. 7, for example. In other embodiments, other hardware components can implement various aspects of process.

At 802, the controller 702 can trigger the predictive model 704 to categorize the image as being a bill or not a bill. Prior to categorization, the controller 702 can clean the image. For example, the controller 702 can clean the image by deskewing angles of the image. The controller 702 can clean the image by converting the image into eight bit size. The controller 702 can remove noise from the image. The controller 702 can convert the image into greyscale. The controller 702 can ensure the image resolution is of 300 dpi, for example. The controller 702 can feed the cleaned image into a neural network (stored at memory 108 for example) for verifying the overall picture format and identifying image attributes. Example image attributes include: company logos and header, boxes or sections, alignment of the text fields, and biller name. If the controller 702 determines that the overall picture format resembles or matches the characteristics of a bill then the image is identified as a bill. If not, then the image is identified as not a bill. The controller 702 can capture image data during the training process to define a structure of characteristics of bills or features that are present in images of bills and not in image of "non-bills", for example. The controller 702 can use templates of bills to identify features or characteristics of bills. Other example characteristics include amount, due date, usage info, previously paid amount, and keywords/vales presented in the array list. If the bill is an e-bill, then the from email address can be used to identify a bill. Biller address details is another example.

The predictive model 704 identifies the image as a bill with a level of confidence. If the predictive model 704 identifies the image as a bill then the controller 702 checks the level of confidence against a predefined threshold. If the level of confidence for the image is above a predefined threshold then the image is considered a bill and is moved on to subsequent processing. An example first predefined threshold is 50%. If the level of confidence for the image is below a defined threshold and the image is identified as a bill then the controller 702 stores the image in the image repository 708 to train the predictive model to increase the accuracy of document processing. An example second predefined threshold is 90%. For this example, if the level of confidence is between 50% and 90% then the controller 702 stores the image in the image repository for training. If the predictive model 704 identifies the image as not a bill then the controller 702 stores the image in a not have Bill database or data set. The confidence interval can have an upper and lower limit, for example. The upper limit and lower limit can be adjusted based on the desired level of confidence to identify the images as a bill. For example, if only 90% of images are captured in this defined range of 50-90%, then it may lower the limit down to 45% to capture more bills.

The process is repeated for each image variation that is created by the image processor server 140.

The controller 702 categorizes and stores the images in the image repository 708. The controller 702 creates data sets of images for each company or biller of a list of companies. The controller 702 categorizes the images based on different formats and company names. The controller 702 stores the images in a company data set. That is, images of bills linked to a specific company are stored in a data set that is also linked to that specific company. The images can be template bills for a specific company. Once there is a statistically significant amount of images under a company name data set then the controller can use the data set to categorize the image as a bill or not a bill by comparing the images directly to optimize and streamline image processing. Once, there are multiple number of images under the company name data set, then use the data set at the categorization step to compare the images templates directly to optimize and streamline the image processing. Instead of following the classification of the image and reading the contents, texts etc., the system 100 can directly verify the format/template, to identify a bill.

At 804, the controller 702 triggers the key value extractor 706 to extract data values from the image. The controller 702 can trigger key value extractor 706 after the image is classified as a bill. To extract data values, the controller 702 reads the image content or text starting from the top left corner, for example. The controller 702 can read text from left to right and from top to bottom, for example. The controller 702 can match the text against a predefined array or data set to identify important keywords. Example keywords include company name, customer account number, customer identifier, amount due, due date, and so on. The controller 702 identifies key values such as company or biller name, account number, customer identifier, amount, due date, and so on. The controller 702 can use an ontology for different keywords. The following are examples.

| Amount Ontology:- | |
| --- | --- |
| total amount due | total amount due: |
| account balance | account balance: |
| total amount due | total amount due: |
| tota current charge | tota current charge: |
| total current month charge | total current month charge: |
| bil total | bil total: |
| total monthly charge | total monthly charge: |
| total balance | total balance: |
| total due | total due: |
| amount due | amount due: |
| total amount due | total amount due: |
| monthly charges | monthly charges: |
| monthly charge | monthly charge: |
| total payable | total payable: |
| total payable | total payable: |
| total current monthly charge | total current monthly charge: |
| total bill | total bill: |
| balance due | balance due: |
| total payment due | total payment due: |
| payment due | payment due: |
| total charges due | total charges due: |
| total due | total due: |
| current bill total | current bill total: |
| Your bill total | Your bill total: |
| your bill total | your bill total: |
| | you bill |

| Account ontology:- |
| --- |
| Account |
| Account number |
| Acc number: |
| Account# |

The controller 702 can implement the following example process to identify the company or biller name. Articles or verbs such as 'The', 'Is', 'Are' etc. can rejected using Natural language processing (NLP). The NLP can use a biller database as part of the vocabulary. The text (Name) that appears maximum number of times on the bill is likely to be the company name. If there is a tie between two names, then the first text that was found on the header section of the bill is most likely to be the biller name. Identified company name/biller name is matched against a biller name database to determine if it is an approved biller. The controller 702 can use NLP to extract the organization name from the image and match it with the text appearing maximum number of times that was identified by the algorithm in the second step to cross verify and increase the accuracy of the model 704.

The controller 702 can implement the following example process to identify the account number. The controller 702 can use a predefined set of keywords e.g. 'Account ID', 'Account #', 'Account number'. to match against the texts that are read from the image. Once, there is a match, controller 702 can look for different formats (e.g. alpha numeric, numeric, Masked account, ##, ** etc.) that are available for the Account number keyword. Find all the places in the document where the keyword 'account number is present' and extract the value for the keyword based on the match format.

The controller 702 can implement the following example process to identify the customer identifier. The controller 702 can use a predefined set of keywords e.g. 'Customer ID', 'Client number', 'Client ID' etc. to match it against the texts that are read from the image. Once, there is a match, look for different formats (e.g. alpha numeric, numeric, Masked account, ##, etc.) that are available for the keyword 'Customer ID'. The controller 702** can find all the places in the document where the keyword 'Customer ID is present' and extract the value for the keyword based on the match format.

The controller 702 can implement the following example process to identify the amount. The controller 702 can use a predefined set of keywords e.g. 'Total Due', 'Amount Due', 'Overall Amount' etc. to match against the texts that are read from the image. Once, there is a match, look for different formats (e.g. numeric etc.) that are available for the amount keyword. Find all the places in the document where the keyword 'amount' is 'present' and extract the value for the keyword based on the match format.

The controller 702 can implement the following example process to identify the due date. The controller 702 can use a predefined set of keywords e.g. 'Due date', 'Amount Due by', 'Payable by' etc. to match against the texts that are read from the image. Once, there is a match, look for different formats (e.g. MM/DD/YY, MM-DD-YYYY etc.) that are available for the amount keyword. Find all the places in the image where the keyword 'Due date' is 'present' and extract the value for the keyword based on the match format.

If the data extraction process cannot identify these fields within the image it can be flagged as "not bill" even though it was initially categorized as a bill. It can be stored in the not bill dataset for training.

At 806, the controller 702 can train the predictive model 704 with the image to increase the accuracy. The controller 702 can store the image in an image repository 708. As noted, the controller 702 computes a level of confidence for identifying the image as a bill. For example, the initial level of confidence or probability to identify that an image is a bill can be set to a predefined threshold such as 50%. The controller 702 can determine whether to train the predictive model 704 with an image. The determination on whether to train using a particular image can be based on the computed level of confidence for identifying an image as a bill and a threshold or range. When the predictive model 704 is trained with multiple genuine bills then the level of confidence increases for repeated bills. The controller 702 does not train the model with images of bills when a predefined threshold of confidence (for example 90%) is achieved to save computing resources. For example, the controller 702 might use an image of a bill to train the predictive model 704 only if the level of confidence is between 50% and 90% and the image is successfully passed categorization at 802 and data extraction at 804. The controller 702 does not self-train the predictive model 704 using non-bill images because it does not want to waste computing resources in improving the accuracy for non-bill images. Accordingly, the controller 702 selectively trains the predictive model 704 using only selected images of bills based on computed levels of confidence.

Image processor server 140 (or controller 702) can implement exception handling and error scenarios. For example, if at the data extraction any of the keywords are not found in an image then an image can be cleaned further and the image resolution can be enhanced. The cleaned and enhanced image can be sent back for categorization and data extraction. That is, if image processor server 140 cannot detect keywords within an image then the image can be digitally modified and the process of categorization and data extraction can be repeated. In some embodiments, if after multiple iterations (e.g. 3 iterations) a required keyword is not found in the image then the image is stored as garbage.

In some embodiments, image processor server 140 can match a masked account number to the correct account number stored in a customer profile a customer record.

Figure 9:
FIG. 9 shows screenshots of example images of bills according to some embodiments.

FIG. 9 shows screenshots of example images of bills according to some embodiments. As shown, the images of bills include masked account numbers 902, 904, 906.

Image processor server 140 can set a mathematical target or threshold for matching up a masked account number to an account number stored in a customer record. The threshold can be adjusted based on tolerance for risk. Image processor server 140 can use different variables to compute or calculate the probability of making a mistake in the match. Example variables can be an exposed account number and company name. For example only a portion of an account number can be masked and there can be an exposed portion of the account number that can be used as a variable in the match process. An example process can be as follows:
Check if account number has 5 or more digits exposed
    IF TRUE=match the 5 digits in the customer biller list and proceed as usual
    IF FALSE Match remaining digits with the biller list ending in the same last digits AND compare and match the first 2 letters of the biller short name with the name passed in from channels.

For masked bills, the image processor server 140 can mathematically calculate the odds. For example, for BILLER A there can be 1 in 100 chance account matches an entry in the customer biller list and 1 in 676 chance first 2 letters of company from bill will match first 2 letters in the shortname. This generates a 1 in 67600 chance there will be the same duplicate combination or 99.99852071% chance this is the correct account. As another example, for BILLER B there can be 1 in 1000 chance account matches an entry in the customer biller list and 1 in 676 chance first 2 letters of company from bill will match first 2 letters in the shortname. This generates a 1 in 676000 chance there will be the same duplicate combination.

The example implementation described herein relates to invoice or bill statements but other example documents can also be processed. For example, the document can be a health claim that can be submitted for interpretation and action. As another example the document can be corporate commercial billers or accounts payable and the platform can process multiple bills together. An example document can be an insurance claim and information for the claim can be submitted through photos and text for processing. A further example can be an airline flight booking that uses customer profile information and travel preferences to book tickets using the platform.

The discussion provides many example embodiments of the inventive subject matter. Although each embodiment represents a single combination of inventive elements, the inventive subject matter is considered to include all possible combinations of the disclosed elements. Thus if one embodiment comprises elements A, B, and C, and a second embodiment comprises elements B and D, then the inventive subject matter is also considered to include other remaining combinations of A, B, C, or D, even if not explicitly disclosed.

The embodiments of the devices, systems and methods described herein may be implemented in a combination of both hardware and software. These embodiments may be implemented on programmable computers, each computer including at least one processor, a data storage system (including volatile memory or non-volatile memory or other data storage elements or a combination thereof), and at least one communication interface.

Program code is applied to input data to perform the functions described herein and to generate output information. The output information is applied to one or more output devices. In some embodiments, the communication interface may be a network communication interface. In embodiments in which elements may be combined, the communication interface may be a software communication interface, such as those for inter-process communication. In still other embodiments, there may be a combination of communication interfaces implemented as hardware, software, and combination thereof.

Throughout the foregoing discussion, numerous references will be made regarding servers, services, interfaces, portals, platforms, or other systems formed from computing devices. It should be appreciated that the use of such terms is deemed to represent one or more computing devices having at least one processor configured to execute software instructions stored on a computer readable tangible, non-transitory medium. For example, a server can include one or more computers operating as a web server, database server, or other type of computer server in a manner to fulfill described roles, responsibilities, or functions.

The technical solution of embodiments may be in the form of a software product. The software product may be stored in a non-volatile or non-transitory storage medium, which can be a compact disk read-only memory (CD-ROM), a USB flash disk, or a removable hard disk. The software product includes a number of instructions that enable a computer device (personal computer, server, or network device) to execute the methods provided by the embodiments.

The embodiments described herein are implemented by physical computer hardware, including computing devices, servers, receivers, transmitters, processors, memory, displays, and networks. The embodiments described herein provide useful physical machines and particularly configured computer hardware arrangements.

Although the embodiments have been described in detail, it should be understood that various changes, substitutions and alterations can be made herein.

Moreover, the scope of the present application is not intended to be limited to the particular embodiments of the process, machine, manufacture, composition of matter, means, methods and steps described in the specification.

As can be understood, the examples described above and illustrated are intended to be exemplary only.

What is claimed is:

1. A system for payment processing using a predictive model for categorizing bill or invoice statements, the system comprising:
    a payment server having non-transitory computer-readable storage medium with computer-executable instructions for causing a processor of the payment server to perform steps including:
        receiving an image of an initial payment request from a first electronic address;
        verifying the first electronic address to retrieve a customer record;
        adjusting at least one image factor of the image;
        inputting image data into the predictive model;
        executing the predictive model to categorize the initial payment request as a bill or not a bill based at least on the image data, the predictive model previously trained based on a set of payment requests and a respective indication on whether each payment request in the set of payment requests is categorized as a bill or a not a bill;

upon categorization of the bill, extracting payment data values from the initial payment request;

training the predictive model using the image data from the initial payment request and the data extracted from the payment request when a confidence value for the categorization of the bill satisfies a threshold;

generating an initial vendor payment request using the extracted payment data based on a vendor format, the extracted payment data indicating a vendor identifier linked to the vendor format;

transmitting a payment confirmation request to a second electronic address, the second electronic address stored in the customer record;

receiving an approval notification in response to the payment confirmation request from the second electronic address, wherein the approval notification is used for training the predictive model;

transmitting the initial vendor payment request;

receiving a payment confirmation indicating successful processing of the initial vendor payment request; and updating a payment record with the payment confirmation and the extracted payment data, the payment record indicating a customer identifier linked to a customer account.

2. The system of claim 1 further comprising:

an electronic wallet application having non-transitory computer-readable storage medium with computer-executable instructions for causing a processor of a mobile device to:

trigger the display of the payment confirmation request on a display of the mobile device;

receive the approval notification in response to the display of the payment confirmation request at the mobile device; and transmit the approval notification to the payment server.

3. The system of claim 1 wherein the payment server is configured to process a registration request to store the first electronic address in the customer record to permit processing of the initial payment request.

4. The system of claim 1 wherein the payment server is configured to determine that the customer record does not indicate bill payment registration and transmit a registration request to the second electronic address stored in the customer record, the registration request indicating that the initial payment request was received from the first electronic address.

5. The system of claim 1 wherein the first electronic address is for a different communication channel or band than the second electronic address.

6. The system of claim 1 wherein the customer record indicates a payment account, wherein the initial vendor payment request indicates the payment account.

7. The system of claim 1 wherein the approval notification indicates a first code that is linked to a second code in the customer record.

8. The system of claim 1 wherein the initial payment request indicates a payment amount, a payment due date, the vendor identifier, and a vendor account identifier.

9. The system of claim 1 wherein the initial vendor payment request indicates a payment amount, a payment due date, the vendor identifier, a vendor account identifier, and a payment account.

10. The system of claim 1 wherein the first electronic address is an email address and the second electronic address is an SMS address.

11. The system of claim 1 wherein the payment server determines if the initial payment request is a duplicate request using historical payment records and upon determining that the initial payment request is a duplicate indicating the detected duplicate in the payment confirmation request.

12. The system of claim 1 wherein the initial payment request indicates a payment amount and a payment due date, the payment due date being a future date, wherein the payment server is configured to hold the initial vendor payment request until the future date.

13. The system of claim 1 wherein the payment server is configured to:

determine that the initial payment request is a recurring request using historical payment records linked to the customer identifier indicated in the customer record, the recurring request indicating a recurring time period;

transmit a second payment confirmation request to the second electronic address for the recurring time period;

receive another approval notification in response to the payment confirmation request from the second electronic address;

transmit a second vendor payment request for the recurring time period;

receive a second payment confirmation indicating successful processing of the second vendor payment request; and update the payment record with the second payment confirmation.

14. A non-transitory computer-readable storage medium with computer-executable instructions for causing a processor to:

receive an image of an initial payment request from a first electronic address;

verify the first electronic address to retrieve a customer record;

adjust at least one image factor of the image;

input image data into a predictive model;

execute the predictive model to categorize the initial payment request as a bill or not a bill based at least on the image data, the predictive model previously trained based on a set of payment requests and a respective indication on whether each payment request in the set of payment requests is categorized as a bill or a not a bill;

upon categorization of the bill, extract payment data values from the initial payment request;

train the predictive model using the image data from the initial payment request and the data extracted from the payment request when a confidence value for the categorization of the bill satisfies a threshold;

generate a vendor payment request using the extracted payment data based on a vendor format, the extracted payment data indicating a vendor identifier linked to the vendor format;

transmit a payment confirmation request to a second electronic address, the second electronic address stored in the customer record;

receive an approval notification in response to the payment confirmation request from the second electronic address, wherein the approval notification is used for training the predictive model;

transmit the vendor payment request;

receive a payment confirmation indicating successful processing of the vendor payment request; and update a payment record with the payment confirmation and the extracted payment data, the payment record indicating a customer identifier linked to a customer account.

\* \* \* \* \*